(12) United States Patent
Crivello

(10) Patent No.: US 7,592,376 B2
(45) Date of Patent: Sep. 22, 2009

(54) PHOTOPOLYMERIZABLE EPOXIDE AND OXETANE COMPOSITIONS

(75) Inventor: James V. Crivello, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 457 days.

(21) Appl. No.: 11/209,530

(22) Filed: Aug. 23, 2005

(65) Prior Publication Data

US 2006/0041032 A1 Feb. 23, 2006

Related U.S. Application Data

(60) Provisional application No. 60/603,698, filed on Aug. 23, 2004.

(51) Int. Cl.
*C08J 3/28* (2006.01)
*C09D 163/00* (2006.01)

(52) U.S. Cl. ............... 522/15; 522/20; 522/168; 522/170

(58) Field of Classification Search ............... 522/15, 522/25, 168, 170, 20
See application file for complete search history.

(56) References Cited

U.S. PATENT DOCUMENTS

| | | | | | |
|---|---|---|---|---|---|
| 4,985,340 | A | * | 1/1991 | Palazzotto et al. | 430/270.1 |
| 5,639,802 | A | * | 6/1997 | Neckers et al. | 522/25 |
| 5,942,554 | A | * | 8/1999 | Ren et al. | 522/25 |
| 5,992,314 | A | * | 11/1999 | Lorenz et al. | 101/128.21 |
| 6,025,017 | A | * | 2/2000 | Roth | 427/146 |
| 6,054,250 | A | * | 4/2000 | Sitzmann et al. | 430/280.1 |
| 6,306,555 | B1 | * | 10/2001 | Schulz et al. | 430/270.1 |
| 6,433,035 | B1 | * | 8/2002 | Grinevich et al. | 522/2 |

OTHER PUBLICATIONS

Akhtar et al., *J. Org. Chem.*, 1990, 55, 4222.
Arnett et al., *Adv. Phys Org Chem* 1976, 13, 83.
Bulut et al., *Polym J Sci: Part A: Polym Chem*, 2005, vol. 43, 3205-3220.
Crivello et al., *J. Polym Sci Part A: Polym Chem* 2001, 39(20), 3578.
Crivello et al., *J. Polym. Sci., Part A: Polym. Chem.* 42, 1630-1646, 2004.
Crivello et al., *J. Polymer Sci., Part A: Polym Chem.Ed.*, 1989, 27, 3951.
Crivello et al; Macromolecular Sci., Pure Appl. Chem., A30, (2/3)189 (1993).
Crivello, J.V., *Ring Opening Polymerization*, 1993, Hanser Pub, Munich, p. 157.
Crivello, et al., *J. Polym Sci Part A: Polym Chem*, 2004, vol. 42, 1630-1646.
Dreyfus et al., *Polym J* 1976, 8, 81.
Falk et al., *Polym Mat Sci Eng Prepr* 2003, 89, 279.
Falk et al., *Polym Sci Part A: Polym Chem Ed* 2003, 41(4), 579.
Goethals, e.J., Adv. Poly Sci 1977, 23, 101.
Goethals, E.J., Makromol. Chem 1978, 179,1681.
Kato et al., *Photoinitiated Polymerization*, Am. Chem. Soc., 2003, p. 285.
Kops et al., Macromolecules 1982, 15, 1200.
Kops et al., Macromolecules 1982, 15, 1225.
Leborgne et al., Cationic Polymerization and Related Processes, Academic Press, 1984, p. 220.
Penczek et al., *Adv Polymer Sci.*, vol. 37, 1980, pp. 1-141.
Sasaki et al., J Polym. Sci., Part A: Plym Chem 1995, 33, 1807.
Sasaki, H., *Proc. RadTech 2000 Technical Conf.*, 2000, p. 61.

* cited by examiner

*Primary Examiner*—Susan W Berman
(74) *Attorney, Agent, or Firm*—Heslin Rothenberg Farley & Mesiti PC

(57) ABSTRACT

Novel radiation-curable or photopolymerizable compositions and methods of use thereof as cured coatings are disclosed. The invention pertains to radiation-curable compositions which contain, in addition to typical components of radiation-curable epoxide and oxetane compositions, a free radical photoinitiator.

13 Claims, 9 Drawing Sheets

PHOTOPOLYMERIZABLE EPOXIDE AND OXETANE COMPOSITIONS

CROSS-REFERENCE TO RELATED APPLICATIONS

This application claims priority from U.S. Provisional Application Ser. No. 60/603,698, filed Aug. 23, 2004, the entire contents of which are incorporated herein by reference.

FIELD OF THE INVENTION

The invention relates to photopolymerizable epoxide and oxetane compositions, methods of use thereof as cured coatings.

BACKGROUND OF THE INVENTION

Photoinitiated cationic ring-opening polymerization is a technique widely employed in a variety of commercial applications for coatings, adhesives, printing inks and stereolithography. In such applications, the polymerizable substrate is subjected to irradiation with light for a brief period during which time the photopolymerization must proceed essentially to completion.

Consequently, only those monomers that undergo very high rates of polymerization may be employed. Certain epoxide monomers display high reactivity in photoinitiated cationic polymerization and are suitable for such uses while most others undergo sluggish reaction and are not. As a consequence, contemporary practical applications such as those mentioned above that require short irradiation periods are restricted to the use of only relatively few, typically expensive, epoxide monomer substrates. Further, due to their slow photocure rates, oxetane monomers are not generally useful by themselves. Thus, a need exists for photopolymerizable epoxide and oxetane compositions that overcome at least one of the aforementioned deficiencies.

SUMMARY OF THE INVENTION

An aspect of the present invention relates to a prepolymer mixture comprising: a first catalyst component comprising from about 1 to about 10 parts by weight of a cationic photoinitiator; a second catalyst component comprising from about 1 to about 10 parts by weight of a free radical photoinitiator; and a monomer component comprising from about 180 to about 220 parts by weight of one or more of a monomer chosen from oxetane monomers and epoxide monomers.

A second aspect of the present invention is a method for coating a substrate comprising: applying the prepolymer mixture described above to a substrate; and exposing the substrate and the applied prepolymer mixture to radiation.

A third aspect of the present invention is a coated substrate manufactured by the method described above.

A fourth aspect of the present invention is an ink comprising: the prepolymer mixture described above; and a dye or a pigment.

A fifth aspect of the present invention is a kit for applying and curing a coating comprising: (a) a prepolymer mixture having a viscosity less than 500,000 centipoises which comprises: (i) a first catalyst component comprising from about 1 to about 10 parts by weight of a cationic photoinitiator; (ii) a second catalyst component comprising from about 1 to about 10 parts by weight of a free radical photoinitiator; and (iii) a monomer component comprising from about 180 to about 220 parts by weight of one or more of a monomer chosen from oxetane monomers and epoxide monomers; and (b) instructions for separately applying and curing said prepolymer mixture.

DETAILED DESCRIPTION OF THE INVENTION

Definitions

Figure 1:
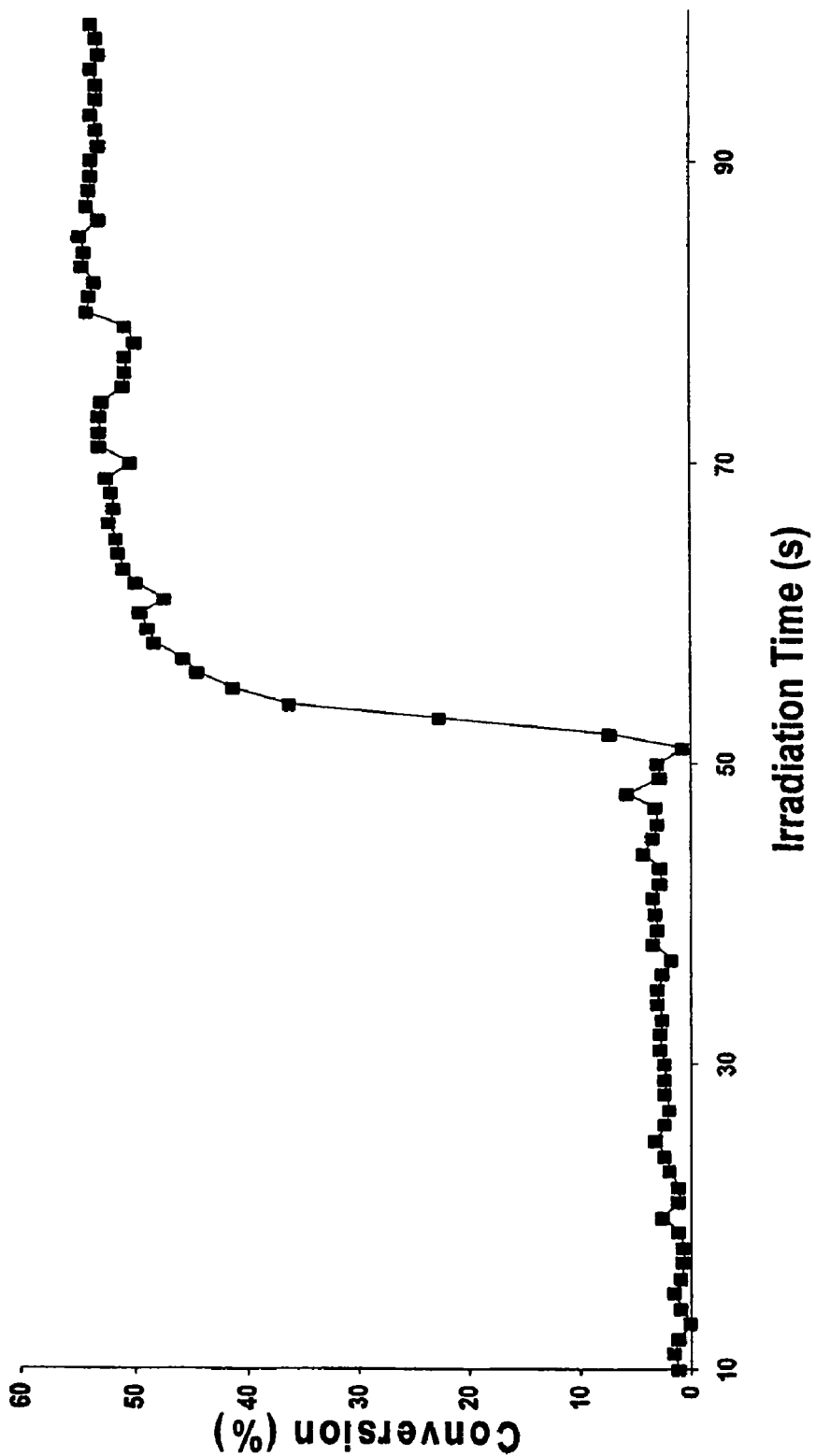
FIG. 1 depicts a plot of a real-time infrared spectroscopy (RTIR) study of the photopolymerization of an oxetane monomer, 3-ethyl-3-phenoxymethyloxetane (POX), in accordance with the present invention.

Throughout this specification the terms and substituents retain their definitions.

The term alkyl is intended to include a linear, a branched, or a cyclic hydrocarbon structure, and combinations thereof. A lower alkyl refers to alkyl groups having from about 1 to about 6 carbon atoms. Examples of lower alkyl groups include but are not limited to methyl, ethyl, n-propyl, isopropyl, and n-, s- and t-butyl, and the like.

A cycloalkyl is a subset of alkyl and includes cyclic hydrocarbon groups having from about 3 to about 8 carbon atoms. Examples of cycloalkyl groups include but are not limited to cyclopropyl, cyclobutyl, cyclopentyl, cyclohexyl, norbornyl, and the like. Typical alkyl groups are those of $C_{20}$ or below in an embodiment of the present invention.

Examples of a $C_1$ to $C_{20}$ hydrocarbon include but are not limited to alkyl, cycloalkyl, alkenyl, alkynyl, aryl and combinations thereof. Examples include: tolyl, xylyl, benzyl, phenethyl, cyclohexylmethyl, camphoryl and naphthylethyl.

Oxaalkyl refers to alkyl residues in which one or more carbons have been replaced by oxygen. Examples include but are not limited to methoxypropoxy, 3,6,9-trioxadecyl and the like.

Aryl and heteroaryl mean a 5- or 6-membered aromatic or heteroaromatic ring containing 0-3 heteroatoms selected from O, N, or S; a bicyclic 9- or 10-membered aromatic or heteroaromatic ring system containing 0-3 heteroatoms selected from O, N, or S; or a tricyclic 13- or 14-membered aromatic or heteroaromatic ring system containing 0-3 heteroatoms selected from O, N, or S.

The terminology relating to "autoacceleration" refers to a polymerization that, having been initiated, proceeds essentially to completion in the absence of any external input of energy. The energy released by the polymerization itself is sufficient to drive the reaction. This phenomenon is commonly observed for exothermic polymerizations in which the heat released from a first condensation is sufficient to supply the activation energy for subsequent condensations. In polymerizations that are not "spontaneous", an initial polymerization does not go substantially to completion without the further provision of energy from a source external to the reaction. The phrase "essentially to completion" is not an absolute, but rather a relative, numerical concept. "essentially to completion" thus refers to about 99% of the ultimate or attainable monomer conversion.

The prepolymer mixture is a liquid. Viscosity is an inherent property of liquids, and for the purposes of the present invention, materials having a viscosity below 500,000 centipoises (cP) are considered useful liquids.

A prepolymer mixture is presented in accordance with the present invention. The prepolymer mixture comprises: a first catalyst component, a second catalyst component, and a monomer component. In an embodiment of the present invention, the first catalyst component is a cationic photoinitiator chosen from the group consisting of a triaryl-sulfonium salt, a diaryl iodonium salt, a dialkylphenacylsulfonium salt, a hydroxyphenyl dialkylsulfonium salt, and the like. The aforementioned salts have cations chosen from the group consisting of $BF_4^-$, $PF_6^-$, $AsF_6^-$, $SbF_6^-$, $GaF_6^-$, $TaF_6^-$, $B(C_6F_5)_4^-$, and $(C_6F_5SO_2)_2CH^-$. The cationic photoinitiator is present in the prepolymer mixture in an amount from about 1 to about 10 parts by weight, i.e. about 0.5% to about 5% by weight of mixtures that consist only of initiator and oxetane or expoxide.

The examples of diaryliodinium cationic photoinitiators described above are not meant to limit the kinds of diaryliodonium cationic photoinitiators that may be used in accordance with the present invention. Diaryliodonium salts that may be used in an embodiment of the prepolymer mixture and method (described infra) of the present invention include salts of the following formula:

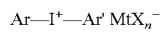

In the above structure, Ar and Ar' are the same or different aryl groups that may bear from 0 to 5 substituents. Those substituents may be aliphatic, aromatic, halo, haloalkyl, nitro, keto, alkoxy, or may contain carboxylic acid groups, unsaturated groups or alkylaryl groups. Further, Ar and Ar' may also represent heterocyclic groups such as furan, thiophene, thioxanthene, thioxanthone or thianthrene groups. In the above structure, $MtX_n^-$ represents an anion of low nucleophilicity.

The second catalyst component is a free radical photoinitiator. In an embodiment, it is chosen from the group consisting of 2,2-dimethoxy-2-phenylacetophenone, 2,2-diethoxy-2-phenylacetophenone, benzoin butyl ether, 2,2-diethoxyacetophenone, 2,2-dibutoxyacetophenone, 1-hydroxycyclohexylphenyl ketone, 2-hydroxyl-2-methyl-1-phenylpropan-1-one, bis(2,4,6-trimethylbenzoyl)phenyl phosphine oxide, (2,4,6-trimethylbenzoyl)diphenyl phosphine oxide, and 2,2,2-trichloro-1-[4-(1,1-dimethyl)phenyl] ethanone. The free radical photoinitiator is present in the prepolymer mixture in an amount from about 1 to about 10 parts by weight, i.e. about 0.5% to about 5% by weight of mixtures that consist only of initiator and oxetane or epoxide.

The examples of free radical photoinitiators described above are not meant to limit the kinds of free radical photoinitiators that may be used in accordance with the present invention. Free radical photoinitiators that may be used in an embodiment of the prepolymer mixture and method (described infra) of the present invention include the class of "cleavage photoinitiators" that directly generate free radicals on photolysis with light.

The monomer component comprises one or more of a monomer chosen from oxetane monomers and epoxide monomers. The monomer component typically is present in the prepolymer mixture in an amount from about 180 to about 220 parts by weight.

Examples of an oxetane monomer component that may be used in an embodiment of the present invention include but are not limited to 3-ethyl-3-phenoxymethyloxetane, 3-ethyl-3-allyloxymethyloxetane, 3-methyl-3-phenoxymethyloxetane, 3-ethyl-3-[(2-ethylhexyloxy)methyl]oxetane, bis {[(1-ethyl(3-oxetanyl)]methyl} ether, 1,4-bis[(3-ethyl-3-oxetanylmethoxy)methyl]benzene, bis[(3-ethyl-3-oxetanylmethoxy)methyl]terephthalate, bis[(3-ethyl-3-oxetanylmethoxy)methyl]phenyl ether, 2-phenyloxetane, 3,3-bischloromethyloxetane, 3,3-dimethyloxetane, 3,3-bisbromomethyloxetane, other like 3,3-substituted oxetanes.

Examples of epoxides that may be used in an embodiment of the present invention include but are not limited to an allyl glycidyl ether, a benzyl glycidyl ether, an α,α-1,4-xylyldiglycidyl ether, a bisphenol-A diglycidyl ether, cresyl glycidyl ether, an ethyleneglycol diglycidyl ether, a diethyleneglycol diglycidyl ether, a neopentylglycol diglycidyl ether, a 1,4-butanediol diglycidyl ether, a 1,4-cyclohexanedimethanol diglycidyl ether, a trimethylopropanetriol triglycidyl ether, a glycerol triglycidyl ether, a cresyl glycidyl ether, a diglycidyl phthalate, a cresol novolac epoxide, a phenol novolac epoxide, a bisphenol-A novolac epoxide, 3,4-epoxycyclohexylmethyl 3',4'-epoxycyclohexane, bis(3,4-epoxycyclohexylmethyl) adipate, 4-vinylcyclohexene-1,2 oxide, limonene dioxide, limonene monoxide, 1,2-epoxydecane, 1,2-epoxydodecane, 1,2-7,8-diepoxyoctane, epoxidized soybean oil, epoxidized linseed oil, epoxidized castor oil, epoxidized natural rubber, epoxidized poly(1,2-butadiene), epoxy functional silicone resins, and the like.

Further examples of epoxides that may be used in an embodiment of the present invention can be represented by the formula:

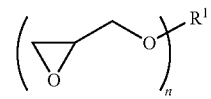

wherein n is an integer from 1-6. When n=1, $R^1$ is a monofunctional alkyl, cycloalkyl, arylalkyl, or heterocyclic alkyl group. When n is >1, $R^1$ is a di- or multifunctional alkylene or arylalkylene group. Examples of compounds include but are not limited to where n=2 are 1,4-butanediol diglycidyl ether, 1,4-xylyleneglycol diglycidyl ether; where n=3, trimethylopropane triglycidyl ether, glycerol triglycidyl ether; where n=4, pentaerythritol tetraglycidyl ether, ditrimethylopropane tetraglycidyl ether; and where n=6, dipentaerythritol hexaglycidyl ether.

The prepolymer mixture of the present invention may additionally comprise one or more of a photosensitizer, a filler, a colorant, a surface active agent, or a leveling agent. The total combined amount of the aforementioned components present in the prepolymer mixture typically is from about 1 to about 20 parts by weight in an embodiment of the present invention.

The wavelength sensitivity of the prepolymer mixture can be adjusted through the use of a photosensitizer. Examples of a photosensitizer that may be used include but are not limited to anthracene, 9,10-di-n-butoxyanthracene, 9-n-butoxyanthracene, 9-n-decyloxyanthracene, 9,10-di-n-propoxyanthracene, 1-ethyl-9,10-di-n-methoxyanthracene, pyrene, 1-decyloxypyrene, 3-decyloxyperylene, pyrene-1-methanol, 9-methylcarbazole, 9-vinylcarbazole, 9-ethylcarbazole, poly (9-vinylcarbazole), phenothiazine, 9-decylphenothiazine, and the like.

Examples of a filler that may be used in an embodiment of the present invention include but are not limited to inorganic particulate fillers such as silica, talc or clays. Examples of reinforcing fibers include glass, poly(ethylene), carbon, and polyimide fibers, as well as impact modifiers, such as core-shell type elastomers, and the like. Examples of a colorant or dye that may be used include but are not limited to copper phthalocyanine, carbon black, dayglow pigments, iron oxide, titanium dioxide, copper oxide, cadmium sulfide, and the like.

Examples of a surface active agent that may be used in embodiment of the present invention include but are not limited to polyethylene glycol-silicone copolymers, fluorinated silicones, fluorinated alkyl ethers, and the like. Examples of leveling and matting agents that may be used include but are not limited to silicones, stearyl alcohol, oleic acid, poly(ethylene) wax, carnauba wax, zein wax, poly(tetrafluoroethylene), and the like.

The prepolymer mixture of the present invention is intended to be spread on or mixed into a substrate. For that reason, the mixture needs a viscosity less than 500,000 cP. Above that viscosity the mixture is too viscous for manipulation. A wide variety of additional additives and modifiers can be used. These include wetting agents, tackifiers, thixotropic agents, adhesion promoters, shrinkage reducing materials such as polymers and flow control agents.

All of aforementioned additives can modify the viscosity, either intentionally or as a consequence of their presence for other utilities. For example, one might want to increase the viscosity of a prepolymer mixture to keep it in place. Alternatively, one might want to employ, as all or part of a prepolymer mixture, an oligomer that, prior to cure, has certain properties characteristic of pressure sensitive adhesives.

A method for coating a substrate is presented in accordance with the present invention. The method comprises: applying the prepolymer described above to a substrate; and exposing said substrate and applied prepolymer mixture to radiation. Examples of techniques for apply the prepolymer mixture to a substrate include but are not limited to dip, roll, brush, pad or spray coating, screen printing, needle dispensing, and other like application techniques. Examples of a substrate that may be used in an embodiment of the present invention include but are not limited to a polymer material, a glass material, a wood material, a metal material, a textile material, a ceramic material, and combinations thereof.

Radiation is understood in the art as electromagnetic radiation in the wavelengths that initiate photochemical reactions. This functional definition is intended for the term as it is used in the present application. An example of radiation that may be used in an embodiment of the present invention is ultraviolet (UV) light. Typically, the radiation of the present invention is of a wavelength in a range from about 200 nanometers (nm) to about 500 nm.

In our studies of photoinitiated cationic ring-opening polymerization of epoxy monomers, we have found that these monomers display a variety of behaviors that can be related to their structures. When highly strained monomers (Class I) such as epoxycyclohexane that bear no means of stabilizing the intermediate protonated species (secondary oxonium ions) are used, the polymerizations are rapid and highly exothermic. Such polymerizations display evidence of thermally activated autoacceleration.

In contrast, monomers that bear neighboring oxygen atoms in the molecule that are located such that they can stabilize the secondary oxonium ion (Class II), undergo photopolymerizations that display pronounced induction periods. Typical of monomers that exhibit this behavior are alkyl glycidyl ethers. Epoxy monomers (Class III) that possess oxygen atoms that are less effective in stabilizing the intermediates comprise a third general class. Included in this class are monomers such as aryl glycidyl ethers. These latter monomers undergo rather slow photoinitiated cationic polymerization without a pronounced induction period. Practical applications for photoinitiated cationic polymerization are currently almost entirely limited to monomers found in Class I.

The use of the method described above has a dramatic acceleration of the polymerizations of typically unreactive monomers (Classes II and III epoxides and oxetanes) as well as reactive monomers (Class I epoxides). Unreactive monomers are made reactive while very reactive monomers are made even better substrates for applications in photopolymerization. The combination of a free radical photoinitiator with a cationic photoinitiator in the prepolymer mixture results in an acceleration of the rate of polymerization when exposed to radiation.

This observation is highly counterintuitive and very surprising. While, the literature contains many citations to the use of simultaneous cationic and free radical polymerizations (so called "hybrid" systems), there are none that demonstrate that the photopolymerization of a cyclic ether monomer (oxetane or epoxide) can be accelerated through the simple combination of a free radical photoinitiator and a cationic photoinitiator. Dramatic acceleration of the rates of polymerization of a wide variety of epoxide and oxetane monomers have been observed and are described infra.

EXPERIMENTAL

Materials

Trimethylene oxide (oxetane), 3,3-bischloromethyloxetane, 3,3-dimethyloxetane, cyclohexene oxide (7-oxabicyclo [4.1.0]heptane), and other reagents used in this work were obtained from the Aldrich Chemical Company, Milwaukee, Wis. 3,4-epoxycyclohexylmethyl 3',4'-cyclohexylcarboxylate (ERL-4221) was purchased from the Union Carbide Corporation (Bound Brook, N.J.). 3-ethyl-3-phenoxymethyloxetane (POX), bis {[(1-ethyl(3-oxetanyl)]methyl} ether (DOX), 1,4-bis[(3-ethyl-3-oxetanylmethoxy)methyl]benzene (XDO) were gratefully received as gifts from the Toagosei Chemical Company, Nagoya, Japan. Irgacure® 651 (1,1 dimethoxy-1-phenylacetophenone), Irgacure 184 (1-benzoyl-1-cyclohexanol) and 819 were kindly received as gifts from the Ciba-Geigy Specialty Chemicals Company, Basel, Switzerland. Unless otherwise noted, all other reagents, monomers and photoinitiators were used as received without further purification.

The diaryliodonium salt and triarylsulfonium salt photoinitiators were prepared according to literature procedures, Crivello, J. V.; Lee, J. L. *J. Polym. Sci., Part A: Polym Chem. Ed.,* 1989, 27, 3951 and Akhtar, S. R.; Crivello, J. V.; Lee, J. L. *J. Org. Chem.,* 1990, 55, 4222 which are both incorporated in there entirety herein by reference. A variety of these photoinitiators were employed and we have developed shorthand designations for these compounds. For example, IOC-15 $SbF_6$ refers to (4-n-pentadecyloxyphenyl)phenyliodonium hexafluoroantimonate having the structure shown below in which a 15 carbon linear chain alkoxy groups is attached to one of the phenyl groups in the 4-position while $SbF_6$ denotes the hexafluoroantimonate anion. In a similar manner, SOC-10 $SbF_6$ refers to S(4-n-dodecyloxyphenyl)-S,S-diphenylsulfonium hexafluoroantimonate with the structure indicated below.

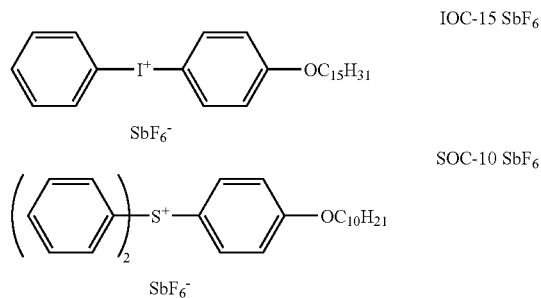

Kinetic Characterization of Epoxide Photopolymerizations

The analytical techniques and apparatus referred to in the present application are real-time infrared spectroscopy (RTIR) and optical pyrometry (OP), both of which are described in Crivello, J. V.; Acosta Ortiz, R. *J Polym Sci Part A: Polym Chem* 2001, 39(20), 3578, Falk, B.; Vallinas, S. M; Crivello, J. V. *J Polym Sci Part A: Polym Chem Ed* 2003, 41(4), 579, and Falk, B.; Vallinas, S. M; Crivello, J. V. *Polym Mat Sci Eng Prepr* 2003, 89, 279, all of which are incorporated in their entirety herein by reference.

Samples for RTIR and OP kinetic analysis were prepared by sandwiching a liquid oxetane monomer containing the designated photoinitiator between two thin (10 μm) films of oriented and corona treated poly(propylene) film using an open polyester mesh as a spacer. The samples were mounted in plastic 2 cm×2 cm slide frames and then inserted into the sample holder for analysis. The average thickness of the samples was 0.912 mm. Irradiation with "cold" UV light was accomplished using a UVEXS Model SCU-110 mercury arc lamp (Sunnyvale, Calif.) equipped with a liquid optic cable.

The liquid optic cable served as a light filter passing UV light of wavelengths greater than 300 nm but, blocking both shorter wavelengths as well as longer wavelengths in the infrared region. Several kinetic runs were performed for each photopolymerizable system and the results reported in this article were the average of at least three kinetic runs. Typically, the reproducibility of the kinetic data was ±5%. All kinetic studies were conducted at ambient laboratory temperature (25-28° C.) unless otherwise noted. All concentrations unless otherwise noted are given in mol % based on the polymerizable functional groups present.

Thin Film Photopolymerizations

A thin film of the oxetane monomer containing the photoinitiator(s) was cast onto a glass microscope slide and then placed on a variable speed conveyor equipped with a 300 W Fusion Systems (Rockville, Md.) microwave activated mercury arc lamp. The speed of the conveyor was adjusted until the film emerged from under the lamp in a tack-free state. This is the maximum conveyor speed corresponding to the lowest energy dose that is required to crosslink the monomer.

EXAMPLES

Example 1

FIG. 1 depicts a plot of a RTIR study of the photopolymerization of an oxetane monomer, 3-ethyl-3-phenoxymethyloxetane (POX) in accordance with the present invention. In a glass vial fitted with a small magnetic stirrer, there was dissolved 0.1 g of the cationic photoinitiator IOC15 $SbF_6$ in 0.5 g dichloromethane. The solution was irradiated with UV light (light intensity of 500 mJ/cm$^2$ min) for 1 minute with the end of the liquid optic probe of a UVEXS Model SCU-110 mercury arc lamp (Sunnyvale, Calif.) placed near the surface of the solution. After irradiation, the solution was slowly added dropwise to 0.5 g of POX. Delayed polymerization of the monomer was observed which took place exothermically 40 seconds after the addition of the irradiated photoinitiator solution was complete. The product was a light brown gel. Referring to FIG. 1, the photopolymerization of POX displayed a long induction period during which only a very slow conversion to polymer is noted. However, at a given point during irradiation, polymerization of this monomer occurs rapidly and is completed in a very short time.

Example 2

Figure 2:
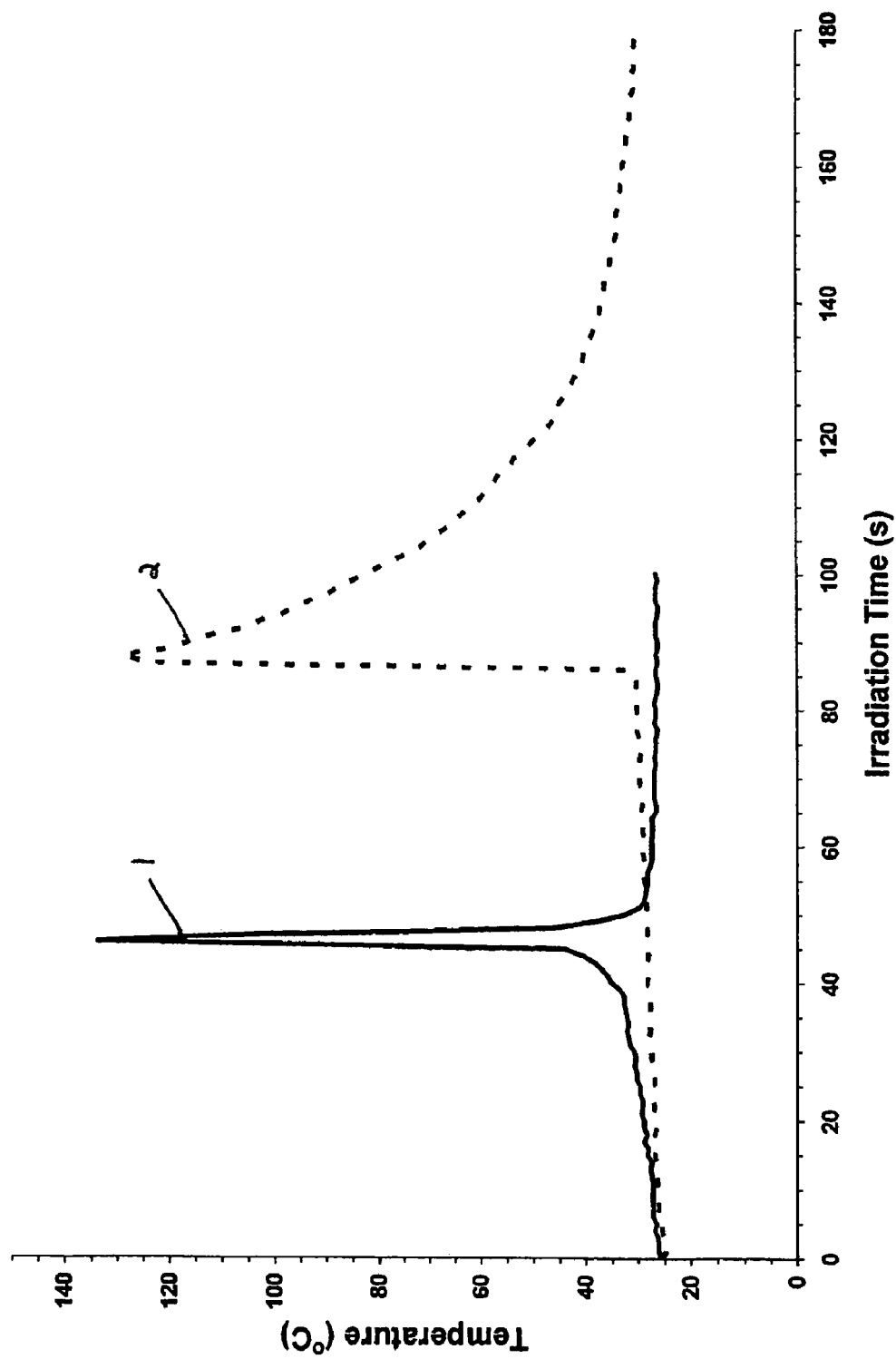
FIG. 2 depicts a plot of the photopolymerization of an oxetane monomer (POX) in the presence of a cationic photoinitiator and a free radical photoinitiator, in accordance with the present invention.

FIG. 2 depicts an OP plot of the photopolymerization of an oxetane monomer (POX) in the presence of a cationic photoinitiator and a free radical photoinitiator in accordance with the present invention. The photoinitiator used in this case was IOC-15 $SbF_6$ at a 1.0 mol. % level in POX. Referring to FIG. 2, curve 1 shows the effect of 1 mol % of the free radical photoinitiator 2,2-dimethoxy-2-phenylacetophenone (Irgacure® 651) and the cationic photoinitiator diaryliodonium salt on the polymerization of POX. In the absence of the free radical photoinitiator, the polymerization of POX displays (curve 2) the typically observed extended induction period followed by rapid, autoaccelerated polymerization. However, when Irgacure® 651 is added, photopolymerization proceeds with a similarly very high exothermicity but with a dramatically shortened induction period, i.e. accelerated photopolymerization (curve 1).

Example 3

Figure 3:
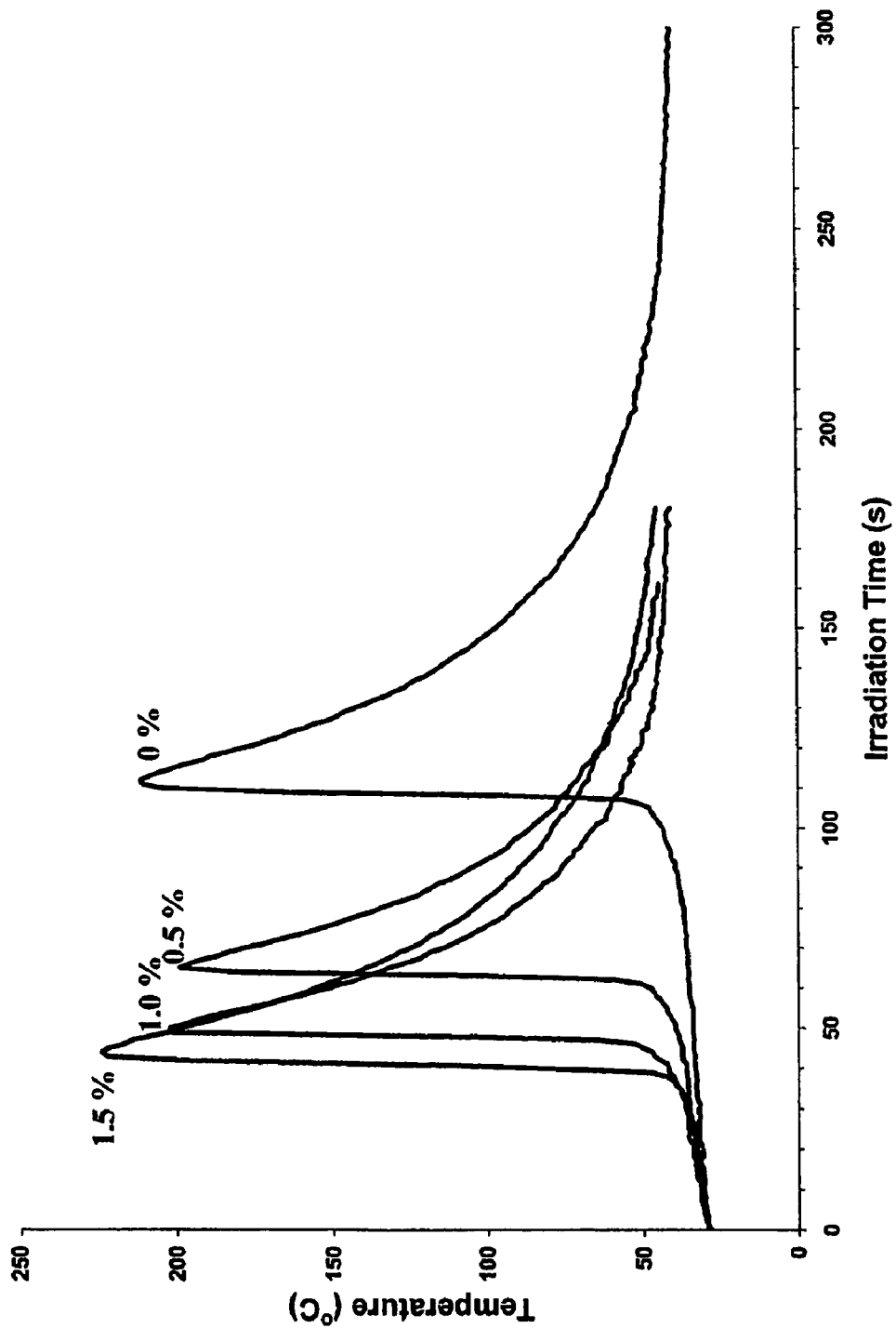
FIG. 3 depicts a plot of an Optical Pyrometry study of the photoinitiated photopolymerization of an oxetane monomer, 1,4-bis[(3-ethyl-3-oxetanylmethoxy)methyl]benzene (XDO), in the presence of a cationic photoinitiator and varying concentrations of a free radical photoinitiator, in accordance with the present invention.

FIG. 3 depicts a plot of an Optical Pyrometry study of the photoinitiated photopolymerization of a bixoxetane monomer, 1,4-bis[(3-ethyl-3-oxetanylmethoxy)methyl]benzene (XDO), in the presence of 1.0 mol % of the cationic photoinitiator IOC-$SbF_6$ by itself and with varying concentrations of Irgacure® 651 as a free radical photoinitiator in accordance with the present invention. Referring to FIG. 3, the length of the induction period is inversely proportional to the quantity of Irgacure® 651 added. However, the effect seems to be maximum at 1.0 mol % of the free radical photoinitiator (1:1 stoichiometric ratio of free radical and cationic photoinitiators). As expected, a further increase to 1.5 mol % of Irgacure® 651 leads to a small incremental reduction in the induction period. Similar to the results of Example 2, photopolymerization proceeds with a dramatically shortened induction period, i.e. accelerated photopolymerization of the oxetane monomer. Similar results were observed when XDO or POX was replaced with oxetane monomer DOX.

Example 4

Figure 4:
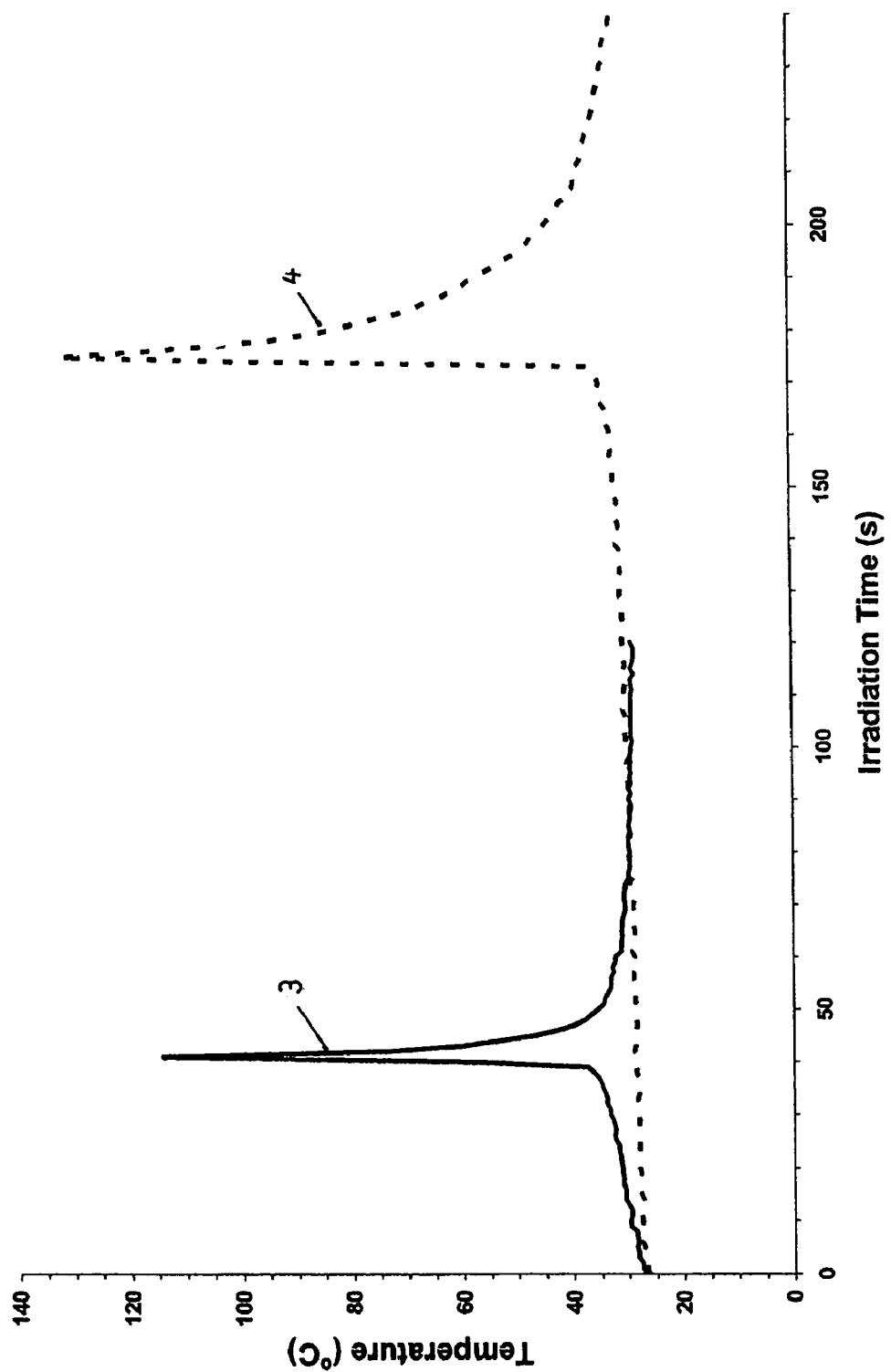
FIG. 4 depicts a plot of a comparison of the photopolymerization of an oxetane monomer (POX) in the presence of a cationic photoinitiator and a free radical initiator to the photopolymerization of an oxetane monomer (POX) in the presence of only a cationic photoinitiator, in accordance with the present invention.

FIG. 4 depicts a plot of a comparison of the photopolymerization of the oxetane monomer (POX) in the presence of a cationic photoinitiator (1.0 mol % diphenyliodonium tetakis (pentafluorophenyl)borate) and in combination with 1.0 mol % of a free radical initiator (Irgacure® 651) to the photopolymerization of the oxetane monomer (POX) in the presence of only a cationic photoinitiator in accordance with the present invention. Referring to FIG. 4, acceleration of the photopolymerization of the oxetane POX is observed (curve 3) when the photopolymerization is carried out in the presence of both a cationic diaryliodonium salt and the free radical photoinitiator Irgacure® 651. In this example, the diaryliodonium salt bore the $(C_6F_5)_4B^-$ counterion. The result is particularly dramatic with a considerable reduction in the induction period (from 173 s to 39 s) and a sharpening of the temperature versus time peak for the sample not containing Irgacure® 651 (curve 4). It is also very interesting to note that the onset temperature of the polymerization in both cases is identical and quite low (36-37° C.).

Example 5

The effect of combing a free radical photoinitiator with a cationic photoinitiator on the photopolymerization of an oxetane monomer was demonstrated in a more practical way by carrying out these photopolymerizations as thin (~25 μm) films cast on glass plates using a conveyorized mercury arc lamp system and determining the minimum irradiation time (highest conveyor speed) that can be used to produce a tack-free film. For example, a prepolymer mixture containing the oxetane monomer XDO and 1.0 mol % of the cationic photoinitiator IOC15 showed no polymerization even at the minimum conveyor speed possible. When the free radical photoinitiator Irgacure® 651 was added to the prepolymer mixture in a 1.0 mol % concentration, irradiation produced a tack-free film at a conveyor speed of 4.4 m/min.

Example 6

Figure 5:
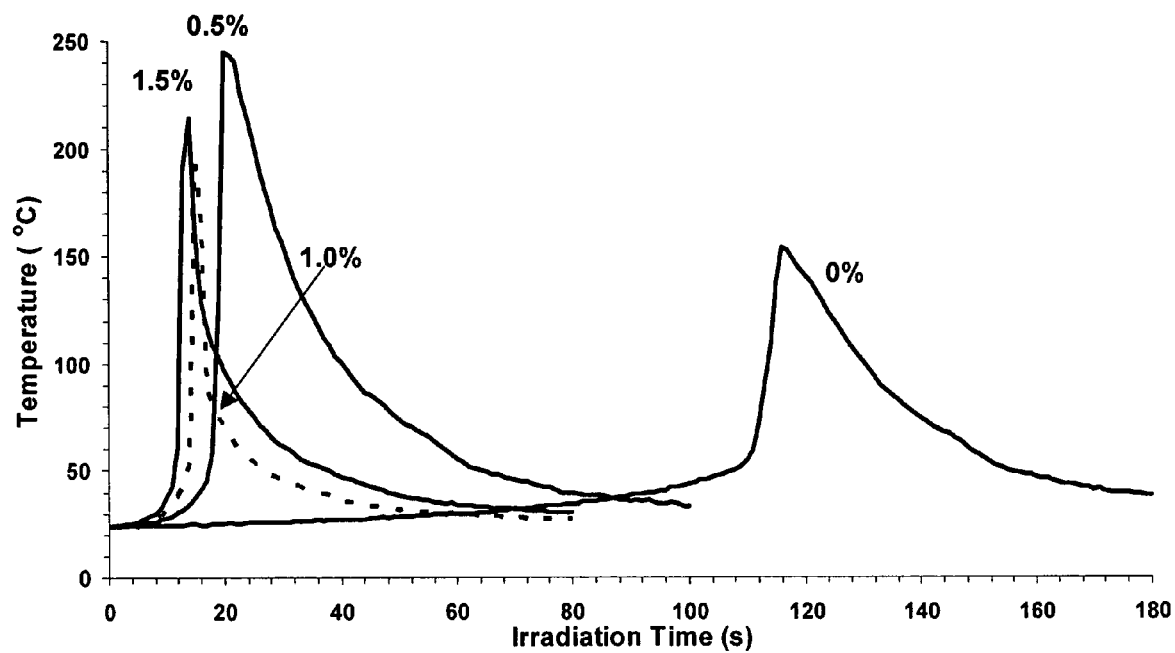
FIG. 5 depicts a plot of an OP study of the photopolymerization of an epoxide (neopentylglycol diglycidyl ether) in the presence of a cationic photoinitiator and varying concentrations of a free radical photoinitiator, in accordance with the present invention.

FIG. 5 depicts a plot of an OP study of the photopolymerization of neopentylglycol diglycidyl ether carried out only with 1.0 mol % IOC-15 $SbF_6$ and also in the presence of various amounts of Irgacure 651®. Referring to FIG. 5, in the absence of this free radical photoinitiator, the photopolymerization of neopentylglycol diglycidyl ether displays the typically observed long induction period followed by rapid, autoaccelerated polymerization. However, when Irgacure 651® is added highly exothermic photopolymerization takes place together with a dramatically shortened induction period. The length of the induction period is inversely proportional to the amount of Irgacure 651® added. It is also worth noting that there is an appreciable sharpening of the temperature versus time peak in the thermogram and that the temperature of this sample exceeds 200° C. during polymerization.

Example 7

Figure 6:
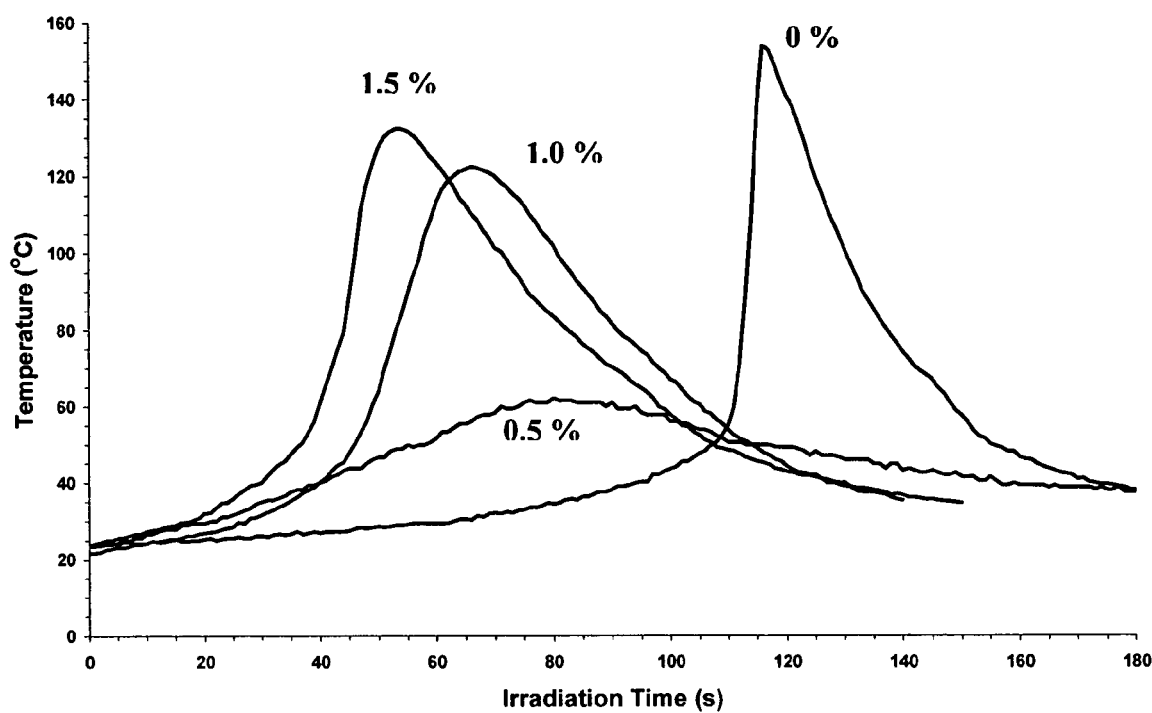
FIG. 6 depicts a plot of the polymerization of an epoxide (neopentylglycol diglycidyl ether) in the presence of a cationic photoinitiator and a second free radical photoinitiator, in accordance with the present invention.

FIG. 6 depicts a plot of the influence of the addition of Irgacure 819® on the photoinitiated cationic polymerization of neopentylglycol diglycidyl ether in the presence of 1.0 mol % IOC-15 $SbF_6$ (light intensity 1030 mJ/cm$^2$ min). Referring to FIG. 6, one can clearly observe a progressive shift in the position of the maximum temperature towards shorter times in as the concentration of Irgacure® 819 is increased. It is evident that there is also an increase in the maximum sample temperature as the concentration of Irgacure 819® is increased. Irgacure 819® possesses strong absorption bands in the 360 nm region.

Example 8

Figure 7:
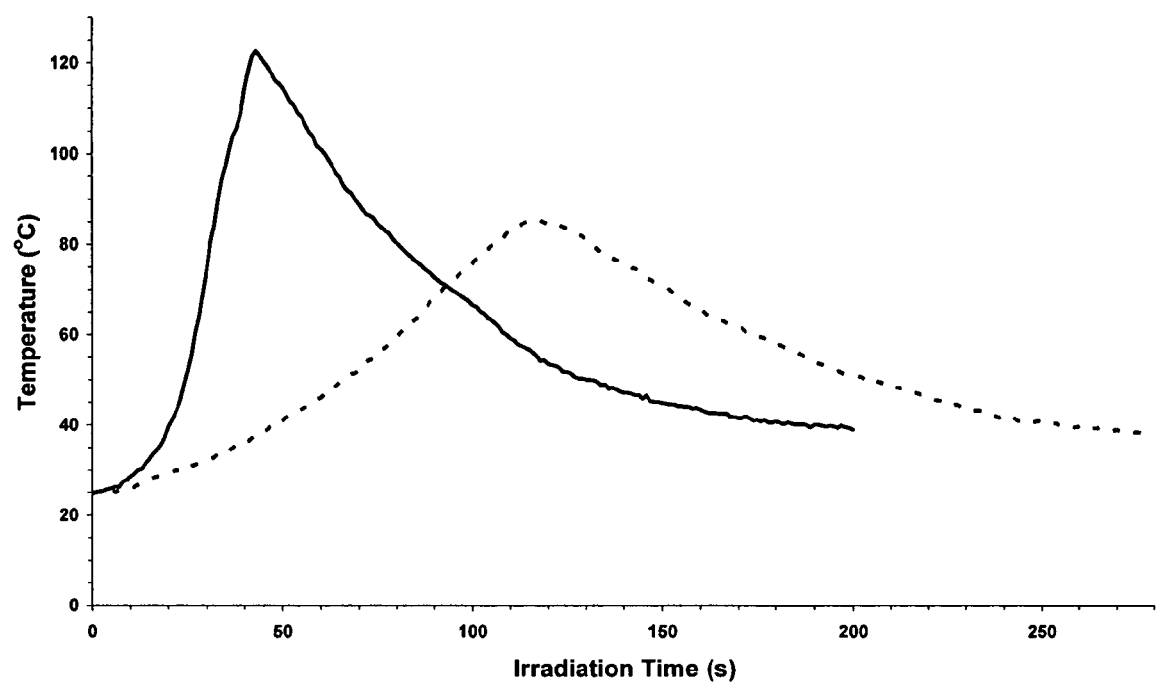
FIG. 7 depicts a plot of an OP study of the photopolymerization of an epoxide (bisphenol-A diglycidyl ether) carried out with a cationic photoinitiator in the presence and absence of a free radical photoinitiator.

FIG. 7 depicts a plot of an OP study of the photopolymerization of bisphenol-A diglycidyl ether carried out with 1.0 mol % IOC-8 $SbF_6$ in the presence (———) and absence (- - - -) of 1.0 mol % Irgacure 651 (light intensity 1060 mJ/cm$^2$ min). Referring to FIG. 7, the rate of this monomer can be markedly accelerated simply by the use of dual cationic and free radical photoinitiators. As may be seen in this figure, the slope of the temperature rise is much greater in the sample that contains Irgacure 651® as compared to when it is absent. In addition, the peak in the thermogram is markedly sharpened and the maximum temperature attained by the sample is much higher as compared to when Irgacure® 651 is absent.

Example 9

Figure 8:
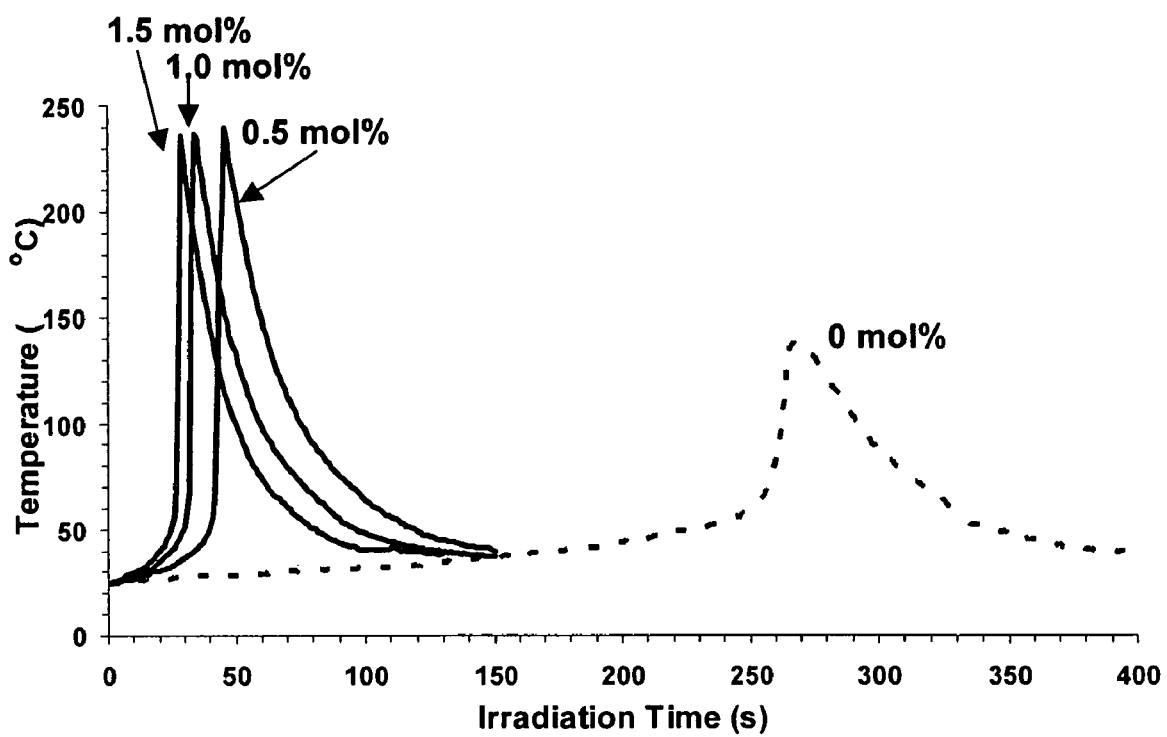
FIG. 8 depicts an OP study of the photopolymerization of an epoxide (1,4-cyclohexanedimethanol diglycidyl ether) in the presence of a cationic photoinitiator and varying concentrations of a free radical photoinitiator, in accordance with the present invention.

FIG. 8 depicts an OP study of the photopolymerization of 1,4-cyclohexanedimethanol diglycidyl ether carried out with 1.0 mol % IOC-15 $SbF_6$ and with different amounts of Irgacure 651. Referring to FIG. 8, there is a dramatic shift in the exothermic peak due to polymerization in the presence of added Irgacure® 651. This shows the dramatic acceleration of the photopolymerization in the presence of Irgacure® 651.

Example 10

Figure 9:
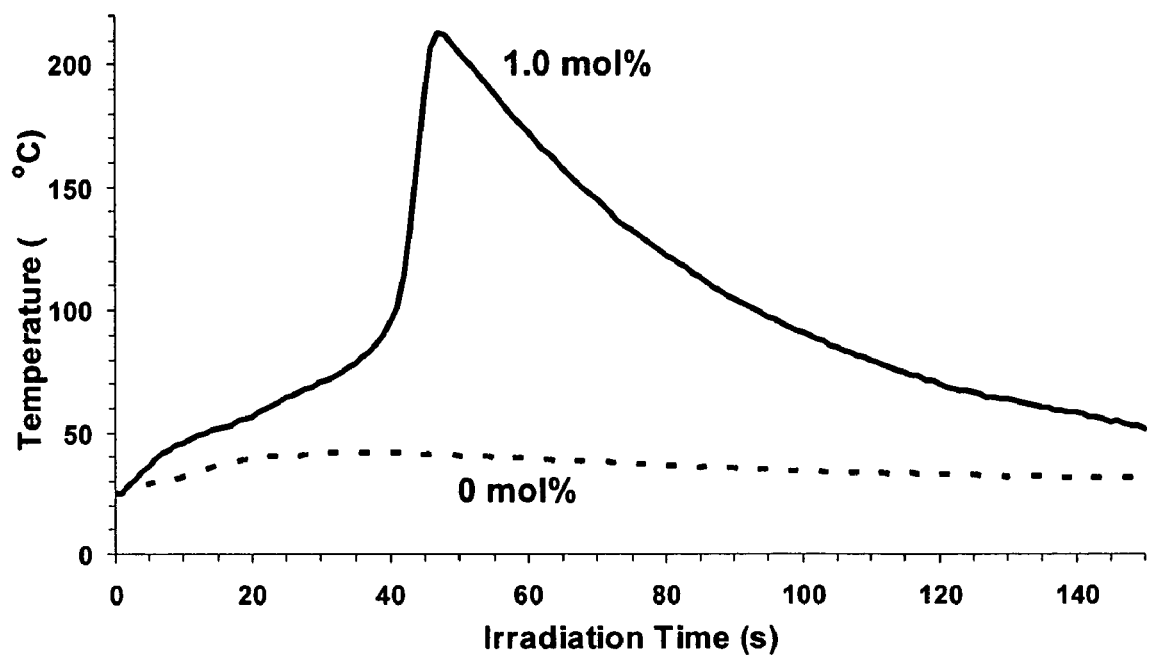
FIG. 9 depicts a plot of the photopolymerization of an epoxide, 3,4-epoxycyclohexylmethyl 3',4'-epoxycyclohexanecarboxylate), in the presence of a cationic photoinitiator and a free radical photoinitiator.

FIG. 9 depicts a plot of the effect of adding 1.0 mol % Irgacure® 651 to the polymerization of 3,4-epoxycyclohexylmethyl 3',4'-epoxycyclohexanecarboxylate containing 1.0 mol % IOC-15 $SbF_6$. Referring to FIG. 9, there is a strong temperature effect due to the acceleration by Irgacure® 651 indicated a much more rapid and effective crosslinking polymerization.

Example 11

The effect of Irgacure 651® on the photopolymerization of neopentylglycol diglycidyl ether was also demonstrated in a practical way by carrying out this photopolymerization as a thin film on glass substrates using a conveyorized lamp system and determining the minimum irradiation time (highest conveyor speed) that can be used to produce a tack-free film. No photopolymerization of the monomer containing 1.0 mol % IOC15 was observed even at the minimum conveyor speed possible, whereas when 1.0 mol % Irgacure® 651 was added a tack-free film was obtained at a conveyor speed of 4.8 m/min. An ink comprising the prepolymer mixture and a dye or pigment is presented in accordance with the present invention. The prepolymer mixture is as described previously in the present application. Examples of the dye or pigment include but are not limited to copper phthalocyanine, carbon black, dayglow pigments, iron oxide, copper oxide, titanium dioxide, cadmium sulfide, and the like. The ink of the present invention may be applied to a substrate that includes but is not limited to a polymer material, a glass material, a wood material, a metal material, a textile material, a ceramic material, and combinations thereof.

What is claimed is:

1. A prepolymer mixture comprising:
   a first catalyst component comprising from 1 to 10 parts by weight of a cationic photoinitiator;
   a second catalyst component comprising from 1 to 10 parts by weight of a free radical photoinitiator chosen from the group consisting of 2,2-dimethoxy-2-phenylacetophenone, 2,2-diethoxy-2-phenylacetophenone, 2,2-diethoxyacetophenone, 2,2-dibutoxyacetophenone, 1-hydroxycyclohexylphenyl ketone, 2-hydroxy-2-methyl-1-phenylpropan-1-one, and 2,2,2-trichloro-1-[4-(1,1-dimethyl)phenyl]ethanone; and
   a monomer component comprising from 180 to 220 parts by weight, said monomer component consisting essentially of one or more oxetane monomers or epoxide monomers, and
   wherein the recited parts by weight are based on the total weight of the first catalyst component, the second catalyst component, and the monomer component, and
   wherein said prepolymer mixture may optionally contain a coloring agent.

2. A prepolymer mixture according to claim 1, wherein said epoxide monomer is a glycidyl ether.

3. A prepolymer mixture according to claim 2, wherein said monomer component includes an epoxide monomer selected from the group consisting of allyl glycidyl ether, benzyl glycidyl ether, α,α-1,4-xylyldiglycidyl ether, bisphenol-A diglycidyl ether, ethyleneglycol diglycidyl ether, diethyleneglycol diglycidyl ether, neopentylglycol diglycidyl ether, 1,4-butanediol diglycidyl ether, 1,4-cyclohexanedimethanol diglycidyl ether, trimethylopropanetriol triglycidyl ether, glycerol triglycidyl ether, cresyl glycidyl ether, diglycidyl phthalate, cresol novolac epoxide, phenol novolac epoxide, bisphenol-A novolac epoxide, 3,4-epoxycyclohexylmethyl 3',4'-epoxycyclohexane, bis(3,4-epoxycyclohexylmethyl)adipate, 4-vinylcyclohexene-1,2-oxide, limonene dioxide, limonene monoxide, 1,2-epoxydecane, 1,2-epoxydodecane, 1,2-7,8-diepoxyoctane, epoxidized soybean oil, epoxidized linseed oil, epoxidized castor oil, epoxidized natural rubber, epoxidized poly(1,2-butadiene) epoxidized poly(1,4-butadiene), and epoxy functional silicone resins.

4. A prepolymer mixture according to claim 1, wherein said monomer is an oxetane.

5. A prepolymer mixture according to claim 4, wherein said monomer component includes an oxetane monomer selected from the group consisting of 3-ethyl-3-phenoxymethyloxetane, 3-ethyl-3-allyloxymethyloxetane, 3-methyl-3-phenoxymethyloxetane, 3-ethyl-3-[(2-ethylhexyloxy)methyl]oxetane, bis{[(1-ethyl(3-oxetanyl)]methyl}ether, 1,4-bis[(3-ethyl-3-oxetanylmethoxy)methyl]benzene, bis[(3-ethyl-3-oxetanylmethoxy)methyl]terephthalate, bis[(3-ethyl-3-oxetanylmethoxy)methyl]phenyl ether, 2-phenyloxetane, 3,3-bischloromethyloxetane 3,3-dimethyloxetane and 3,3-bisbromomethyloxetane.

6. A prepolymer mixture according to claim 1, wherein said cationic photoinitiator is a diaryl-iodonium salt having counterions chosen from the group consisting of $BF_4^-$, $PF_6^-$, $AsF_6^-$, $SbF_6^-$, $GaF_6^-$, $TaF_6^-$, $B(C_6F_5)_4^-$, and $(C_6F_5SO_2)_2CH^-$.

7. A prepolymer mixture according to claim 1 further comprising one or more of a photosensitizer, a filler, a reinforcing filler, a colorant, a surface active agent, or a leveling agent.

8. A prepolymer mixture according to claim 7, wherein said photosensitizer is chosen from anthracene, 9,10-di-n-butoxyanthracene, 9-n-butoxyanthracene, 9-n-decyloxyanthracene, 9,10-di-n-propoxyanthracene, 1-ethyl-9,10-di-n-methoxyanthracene, pyrene, 1-decyloxypyrene, 3-decyloxyperylene, pyrene-1-methanol, 9-methylcarbazole, 9-vinylcarbazole, 9-ethylcarbazole, poly(9-vinylcarbazole), phenothiazine, and 9-decylphenothiazine.

9. An ink comprising:
   said prepolymer mixture of claim 1; and
   a dye or a pigment.

10. The ink of claim 9, wherein said dye or said pigment is selected from the group consisting of copper phthalocyanine, carbon black, dayglow pigments, iron oxide, copper oxide, titanium dioxide, cadmium sulfide, and combinations thereof.

11. A method for coating a substrate comprising:
    applying said prepolymer mixture of claim 1 to a substrate; and
    exposing said substrate and applied said prepolymer mixture to radiation.

12. The method of claim 11, wherein said substrate is a material selected from the group consisting of a polymer, a glass, a wood, a metal, a textile, a ceramic, and combinations thereof 13. The method of claim 11, wherein said radiation is of a wavelength in a range from 200 nm to 500 nm.

* * * * *